(12) United States Patent
Daub et al.

(10) Patent No.: US 11,855,249 B2
(45) Date of Patent: Dec. 26, 2023

(54) ENERGY STORAGE CELL, PRODUCTION METHOD AND APPARATUS FOR CARRYING OUT SUCH A METHOD

(71) Applicant: Bayerische Motoren Werke Aktiengesellschaft, Munich (DE)

(72) Inventors: Ruediger Daub, Groebenzell (DE); Franz Fuchs, Munich (DE); Simon Lux, Munich (DE); Christoph Piller, Herrsching (DE); Seokyoon Yoo, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 201 days.

(21) Appl. No.: 17/295,313

(22) PCT Filed: Nov. 19, 2019

(86) PCT No.: PCT/EP2019/081824
§ 371 (c)(1),
(2) Date: May 19, 2021

(87) PCT Pub. No.: WO2020/120081
PCT Pub. Date: Jun. 18, 2020

(65) Prior Publication Data
US 2022/0013804 A1      Jan. 13, 2022

(30) Foreign Application Priority Data

Dec. 13, 2018 (DE) ..................... 10 2018 132 179.1

(51) Int. Cl.
*H01M 10/04* (2006.01)
*H01M 50/528* (2021.01)
(Continued)

(52) U.S. Cl.
CPC ... *H01M 10/0404* (2013.01); *H01M 10/0413* (2013.01); *H01M 10/058* (2013.01);
(Continued)

(58) Field of Classification Search
CPC .......... H01M 2220/20; H01M 50/528; H01M 50/533; H01M 50/536; H01M 50/54;
(Continued)

(56) References Cited

U.S. PATENT DOCUMENTS

2007/0117009 A1* 5/2007 Yamauchi ............. H01M 50/54
429/66
2013/0011717 A1  1/2013 Yotsumoto
(Continued)

FOREIGN PATENT DOCUMENTS

CN    103050656 A    4/2013
CN    104662708 A    5/2015
(Continued)

OTHER PUBLICATIONS

International Search Report (PCT/ISA/210) issued in PCT Application No. PCT/EP2019/081824 dated Mar. 4, 2020 with English translation (five (5) pages).
(Continued)

*Primary Examiner* — Kiran Quraishi Akhtar
(74) *Attorney, Agent, or Firm* — Crowell & Moring LLP

(57) ABSTRACT

A method for producing an electrochemical energy storage cell is provided. A current conductor, which is configured for electrically connecting an electrode stack to a cell terminal and has a contact arm, is positioned relative to the electrode stack such that an edge of the contact arm abuts a first lateral surface of a conductor arrangement that projects out of the electrode stack. The conductor arrangement is bent around the edge of the contact arm such that the first lateral surface of the conductor arrangement rests at least in part on a first
(Continued)

contact arm lateral surface. The contact arm is supported on a second contact arm lateral surface opposite the first contact arm lateral surface. A contact pressure is exerted on the conductor arrangement resting at least in part on the first contact arm lateral surface, and the conductor arrangement is connected to the current conductor.

8 Claims, 5 Drawing Sheets

(51) Int. Cl.
   *H01M 50/54* (2021.01)
   *H01M 50/536* (2021.01)
   *H01M 10/058* (2010.01)
   *H01M 50/533* (2021.01)

(52) U.S. Cl.
   CPC ....... *H01M 50/528* (2021.01); *H01M 50/533* (2021.01); *H01M 50/536* (2021.01); *H01M 50/54* (2021.01); *H01M 2220/20* (2013.01)

(58) Field of Classification Search
   CPC ......... H01M 10/0404; H01M 10/0413; H01M 10/058; Y02E 60/10; Y02P 70/50
   See application file for complete search history.

(56) References Cited

U.S. PATENT DOCUMENTS

| | | | |
|---|---|---|---|
| 2013/0095372 A1 | 4/2013 | Kim et al. | |
| 2015/0280274 A1 | 10/2015 | Deponte et al. | |
| 2016/0308187 A1 | 10/2016 | Subramanian et al. | |
| 2017/0125774 A1* | 5/2017 | Choi | H01M 50/211 |
| 2019/0221821 A1 | 7/2019 | Xing et al. | |
| 2022/0013804 A1* | 1/2022 | Daub | H01M 10/0404 |

FOREIGN PATENT DOCUMENTS

| | | |
|---|---|---|
| CN | 106058128 A | 10/2016 |
| CN | 106133948 A | 11/2016 |
| CN | 108258180 A | 7/2018 |
| DE | 10 2014 014 529 A1 | 3/2016 |
| DE | 10 2014 019 505 A1 | 6/2016 |
| EP | 2 793 293 A1 | 10/2014 |
| EP | 3 109 925 A1 | 12/2016 |
| JP | 2007-149353 A | 6/2007 |
| JP | 2009-187768 A | 8/2009 |
| JP | 2013-89592 A | 5/2013 |
| JP | 2013-161686 A | 8/2013 |
| JP | 5838838 B2 | 1/2016 |

OTHER PUBLICATIONS

German-language Written Opinion (PCT/ISA/237) issued in PCT Application No. PCT/EP2019/081824 dated Mar. 4, 2020 (five (5) pages).

German-language Search Report issued in German Application No. 10 2018 132 179.1 dated Oct. 23, 2019 with partial English translation (11 pages).

Japanese-language Office Action issued in Japanese Application No. 2021-526280 dated Jun. 7, 2023 with English translation (4 pages).

Chinese-language Office Action issued in Chinese Application No. 201980069684.1 dated Aug. 26, 2022 with English translation (14 pages).

* cited by examiner

ENERGY STORAGE CELL, PRODUCTION METHOD AND APPARATUS FOR CARRYING OUT SUCH A METHOD

BACKGROUND AND SUMMARY OF THE INVENTION

The present invention relates to a method for producing an electrochemical energy storage cell, to an electrochemical energy storage cell produced by such a method, and to an apparatus for carrying out such a production method.

An electrochemical energy storage cell generally comprises two oppositely poled cell terminals, by use of which the energy storage cell can be integrated into a circuit. The cell terminals must in this case be electrically connected to electrodes of the energy storage cell. For this purpose, current conductors which lead from conductor lugs of the electrodes, which are arranged for example in an electrode stack, to the cell terminals are conventionally provided.

When electrochemical energy storage cells are intended to be used in at least partially electrically operated vehicles, the energy storage cells generally have to satisfy stringent requirements in respect of their dimensions so that the energy storage cells can be installed efficiently in the vehicle, for example in the floor of the passenger compartment.

It is an object of the present invention to improve the current conduction in electrochemical energy storage cells, in particular to increase the reliability of the current conduction with at the same time a small space requirement.

This object is achieved by a method for producing electrochemical energy storage cells, an electrochemical energy storage cell produced by such a method, and an apparatus for carrying out such a method according to the claimed invention.

A first aspect of the invention relates to a method for producing electrochemical energy storage cells, comprising: (i) a positioning step in which a current conductor, which is adapted for the electrical connection of an electrode stack to a cell terminal and comprises a contact arm, is positioned relative to the electrode stack in such a way that an edge of the contact arm bears on a first side face of a conductor arrangement of the electrode stack, which protrudes from the electrode stack; (ii) a bending step in which the conductor arrangement is bent around the edge of the contact arm in such a way that the first side face of the conductor arrangement bears at least in sections on a first contact arm side face; (iii) a supporting step in which the contact arm is supported on a second contact arm side face lying opposite the first contact arm side face; (iv) a pressing step in which a pressing force is exerted on the conductor arrangement bearing at least in sections on the first contact arm side face; and (v) a connecting step in which the conductor arrangement is connected to the current conductor.

This is advantageous in particular since the conductor arrangement may in this case at least in sections extend flatly on the electrode stack, in particular along a side face of the electrode stack, and the space requirement of the conductor arrangement in the energy storage cell produced is therefore reduced. In other words, this allows routing of the current conductor particularly closely along the electrode stack.

The pressing of the conductor arrangement at least in sections onto the first contact arm side face in this case makes it possible to produce a particularly accurate and durable connection for instance a weld seam, by which the flow of current from the conductor arrangement into the current conductor or vice versa is not impeded, or is at most only slightly impeded. The at least partial pressing may, in particular, achieve the effect that the contact surface between the conductor arrangement and the current conductor is as large as possible. The conductor arrangement may thereby be connected particularly reliably to the current conductor. Furthermore, improved current conduction may also be achieved in this way.

The supporting of the contact arm, in particular against the pressing force, in this case makes it possible to align the conductor arrangement bearing at least in sections on the first contact arm side face, and/or the first contact arm side face, precisely for the subsequent connection. For example, the conductor arrangement and the first contact arm side face may therefore be positioned precisely in relation to a focused laser beam, so that efficient use of the laser energy is made possible and accidental damage, for example to the electrode stack, by the laser beam can be avoided.

It is conceivable for the supporting step to be carried out not only before the pressing step, but already before the bending step, in order to support the current conductor against forces which occur when bending the conductor arrangement around the edge. This can prevent the current conductor from being damaged, for example bent, and/or being positioned unfavorably for the connection to be produced in the connecting step.

Overall, embodiments of the present invention make it possible to improve the current conduction in electrochemical energy storage cells, in particular to increase the reliability of the current conduction with a small space requirement.

Preferred embodiments of the invention and refinements thereof, which unless explicitly excluded may respectively be combined in any desired way with one another and with the aspects of the invention which are described below, will now be described.

In some embodiments, the current conductor is positioned relative to the electrode stack in the positioning step in such a way that an intermediate space is defined between the second contact arm side face and the electrode stack. Preferably, a supporting element for supporting the contact arm against the pressing force is introduced into the intermediate space in the supporting step. In this case, the supporting element is preferably positioned in the intermediate space in such a way that the second contact arm side face bears at least in sections on the supporting element. The pressing force may therefore be absorbed particularly reliably. In particular, an accidental position change of the current conductor and of the conductor arrangement bent around the edge when applying the pressing force may be avoided, so that the connection between the conductor arrangement and the current conductor may be produced more reliably and more accurately.

In some embodiments, the supporting element is removed from the intermediate space after the connection of the conductor arrangement to the current conductor. In this way, for example, the weight of the energy storage cell produced may be reduced.

It is also conceivable to fill the intermediate space, for example with foam, after the removal of the supporting element. In this way, the stability of the assembly consisting of the current conductor and the conductor arrangement may be increased.

In some embodiments, a laser beam for welding the conductor arrangement to the current conductor is guided at least in sections along the contact arm, in particular along a shoulder in the contact arm, which preferably extends along the contact arm, in the connecting step. In this case, the laser beam is preferably configured as a focused laser beam. The current conductor may then be positioned in the positioning step in such a way that the first contact arm side face, in particular the shoulder in the contact arm, and/or the conductor arrangement bent onto the contact arm, is located at least in sections at a focal point of the laser beam. The conductor arrangement and the current conductor may thus be welded particularly reliably and accurately. The laser beam furthermore makes it possible to deposit the energy required for connecting the contact arm to the conductor arrangement precisely and/or selectively in the conductor arrangement and/or the contact arm, so that the conductor arrangement and/or the contact arm are for example heated only locally and the electrode stack is not damaged by accidental heat input.

In some embodiments, the method furthermore comprises: (i) an application step in which a connecting element is applied on a second side face of the conductor arrangement, lying opposite the first side face, in such a way that the connecting element ends substantially level with a shoulder of the contact arm, which extends along the contact arm, when the conductor arrangement is bent around the edge of the contact arm. For example, the contact arm may be configured in a shouldered fashion or comprise a shoulder, in particular on the first contact arm side face. Because the connecting element ends substantially level with the shoulder, and is preferably flush with the shoulder, the connecting element may be connected accurately and particularly stably to the current conductor, for example by guiding the laser beam along a contact line between the connecting element and the shoulder.

In some embodiments, the connecting element is applied on the second side face by ultrasound welding. In this way, the connecting element may be applied rapidly and reliably on the second side face, and in particular arranged precisely on the second side face.

In some embodiments, the method furthermore comprises: (i) an aligning step in which a positioning pin is engaged through at least one positioning pin hole in the connecting element and at least one positioning pin hole, corresponding therewith, in the contact arm. For example, the at least one positioning pin hole in the connecting element and/or the at least one positioning pin hole in the contact arm may be arranged on the connecting element or the contact arm, respectively, in such a way that the positioning pin holes are flush with one another because of the bending of the conductor arrangement around the edge of the contact arm. The engagement of the at least one positioning pin through the positioning pin holes allows particularly precise alignment of the conductor arrangement relative to the current conductor, and in particular reliable securing of the position of the conductor arrangement relative to the current conductor during the connecting step, in particular during the laser welding. This is advantageous in relation to the quality of the connection produced in this case, for example the weld seam.

In some embodiments, the conductor arrangement of the electrode stack, in particular the first electrode stack, is inserted in the positioning step together with a further conductor arrangement of a further electrode stack, in particular a second electrode stack, jointly into a contact arm intermediate space defined between the contact arm, in particular the first contact arm, of the current conductor and a further contact arm, in particular a second contact arm, of the current conductor, extending parallel thereto, so that the second side face of the conductor arrangement lies opposite a second side face of the further conductor arrangement. For example, a first electrode stack and a second electrode stack may be combined, i.e. joined together, so that the current conductor can simultaneously be positioned relative to the conductor arrangements of the two electrode stacks. This allows an improvement of the precision with which the current conductor is positioned relative to the conductor arrangements. In particular, in this case the two contact arms of the current conductor may be used as guide rails for the conductor arrangements of the two electrode stacks.

The conductor arrangements of the two electrode stacks are in this case preferably configured, in particular aligned, in such a way that a second side face of the conductor arrangement of the first electrode stack faces toward the conductor arrangement of the second electrode stack, or a second side face of the conductor arrangement of the second electrode stack faces toward the conductor arrangement of the first electrode stack. For example, the first and the second electrode stack, in particular the conductor arrangements of the two electrode stacks, may be configured symmetrically in relation to a symmetry plane, the symmetry plane preferably being defined by a contact surface between the first electrode stack and the second electrode stack.

In some embodiments, at least the bending step, the supporting step, the pressing step and the connecting step are carried out for each of the two conductor arrangements, in particular at least substantially simultaneously in each case. Stability of the already assembled components of the energy storage cell may thereby be ensured in the course of the production method.

A second aspect of the invention relates to an electrochemical energy storage cell which can be obtained by the method according to the first aspect of the invention.

A third aspect of the invention relates to an apparatus for producing an electrochemical energy storage cell, which is adapted for carrying out a method according to the first aspect of the invention.

In some embodiments, the apparatus comprises at least one supporting element which is adapted to support the contact arm of a current conductor against a pressing force acting on the contact arm, in particular on a conductor arrangement bearing at least in sections on the contact arm. The apparatus is in this case preferably adapted to introduce, for instance to swivel, the at least one supporting element into an intermediate space formed between the contact arm and an electrode stack, and to remove it, for example to swivel it out, from the intermediate space after the contact arm has been connected, for example welded, to the conductor arrangement.

In some embodiments, the apparatus comprises at least one connecting module which is adapted to connect, in particular materially and/or electrically conductively, the current conductor, in particular at least one contact arm of the current conductor to at least one conductor arrangement. Preferably, the connecting module is in this case adapted to weld the current conductor to the conductor arrangement with the aid of a laser beam. The connecting module may for example comprise a beam source which is adapted to generate the laser beam, the generated laser beam preferably having a focal point at which the laser beam is focused. Furthermore, the beam source may be adapted to manipulate, for example to deflect, the laser beam in such a way that the focal point is guided along at least one welding line, in particular a contact line between the conductor arrangement, or the connecting element, and the shoulder of the contact arm.

The current conductor is in this case preferably positioned relative to the electrode stack in such a way that the current conductor is located at least in sections at the focal point, and in particular extends along the welding line. In this way, the current conductor may be connected easily and reliably to the conductor arrangement.

The features and advantages described in relation to the first aspect of the invention and its advantageous configuration also apply to the second and third aspect of the invention and their advantageous configurations, and vice versa, at least where technically feasible.

Further features, advantages and application possibilities of the invention may be found in the following description in conjunction with the figures, throughout which the same references are used for elements of the invention which are the same or which correspond to one another.

DETAILED DESCRIPTION OF THE DRAWINGS

Figure 1:
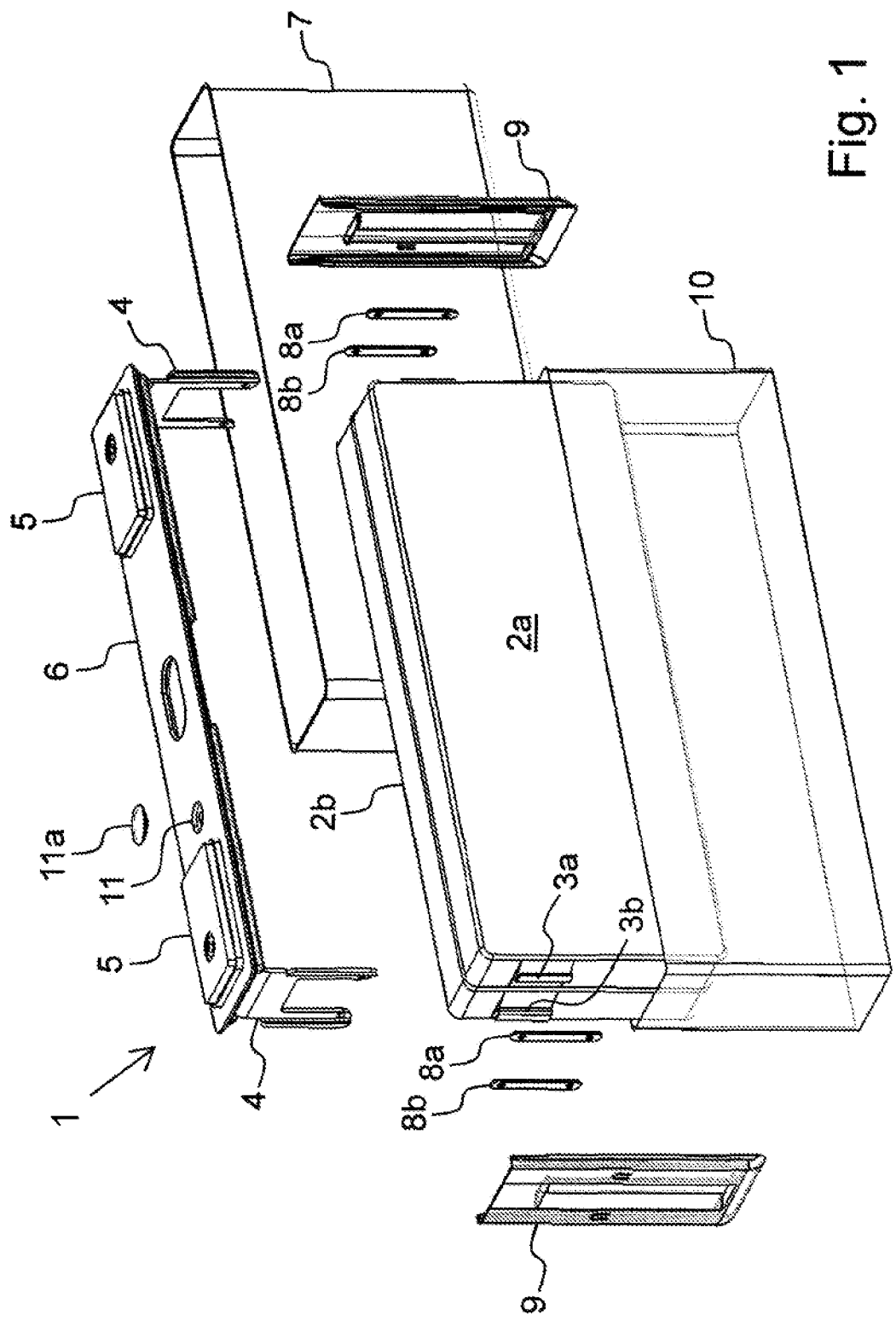
FIG. 1 shows a preferred exemplary embodiment of an energy storage cell according to the invention in an exploded representation.

FIG. 1 shows a preferred exemplary embodiment of an electrochemical energy storage cell 1 according to the invention in an exploded representation. The energy storage cell 1 comprises two electrode stacks 2a, 2b with conductor arrangements 3a, 3b protruding from the electrode stacks 2a, 2b, two current conductors 4, two terminal elements 5 arranged in a housing cover 6, and a housing 7. In this case, in the assembled state of the energy storage cell 1, the current conductors 4 are electrically conductively connected by connecting elements 8a, 8b to the conductor arrangements 3a, 3b. Furthermore, the current conductors 4 are also electrically conductively connected to the terminal elements 5, so that the energy storage cell 1 can be integrated by the terminal elements 5 into a circuit, for example into an electrical system of a vehicle.

The electrode stacks 2a, 2b are preferably held together with the current conductors 4, and as an alternative or in addition are also held together with the housing cover 6, by side frames 9. At least, however, the side frames 9 stabilize the arrangement consisting of the electrode stacks 2a, 2b and current conductors 4, and as an alternative or in addition also the housing cover 6.

The electrode stacks 2a, 2b, and at least in sections also the current conductors 4, are preferably electrically insulated from the housing 7 by an insulating element 10. The insulating element 10 may for example be formed as an insulating tape, which is preferably wound around the electrode stacks 2a, 2b and at least a section of the current conductors 4, and optionally around the side frames 9.

Preferably, the housing cover has a filling opening 11, through which the energy storage cell 1 may for example be filled with an electrolyte. The filling opening 11 may preferably have a valve, in particular a nonreturn valve, which prevents the electrolyte with which the energy storage cell 1 is filled from emerging. As an alternative or in addition, the filling opening 11 may also be closed with a filling opening plug 11a.

Figure 2:
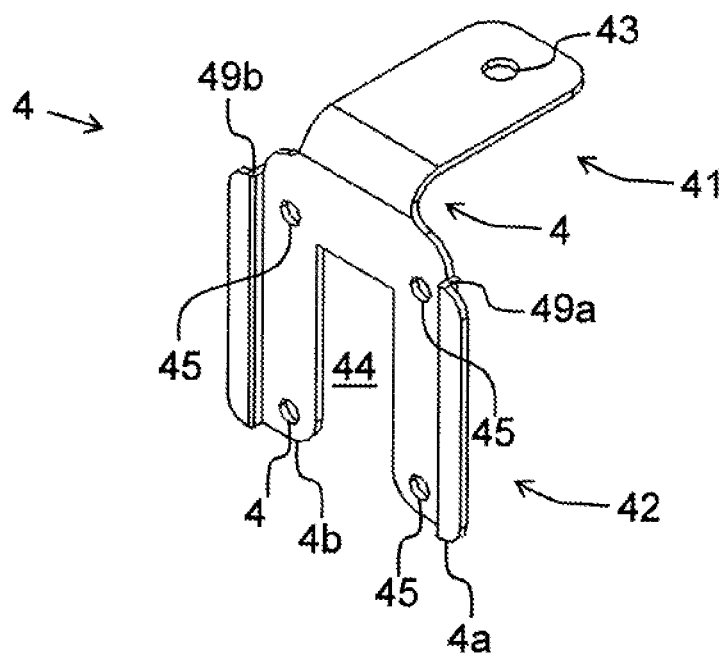
FIG. 2 shows a preferred embodiment of a current conductor.

FIG. 2 shows a preferred embodiment of a current conductor 4, by use of which conductor arrangements of two adjacently arranged electrode stacks may be electrically conductively connected to a terminal element of an electrochemical energy storage cell.

The current conductor 4 comprises a first current conductor region 41, which is spatially separated from a second current conductor region 42 by a curvature region 40 in which the current conductor 4 is curved, in particular through 90°. In the first current conductor region 41, the current conductor 4 can be electrically conductively connected to a terminal element, for instance by a connector (not shown), in particular a rod-shaped connector, which engages, for example is screwed, into a corresponding connector receiver 43, arranged in the first current conductor region 41, of the current conductor 4.

In the second current conductor region 42, the current conductor 4 preferably comprises two contact arms 4a, 4b, in particular extending parallel to one another, which are provided for connection to the conductor arrangements. The contact arms 4a, 4b in this case preferably protrude in the manner of brackets in order to receive the conductor arrangements between them. In other words, the contact arms 4a, 4b define between them a contact arm intermediate space 44, into which the conductor arrangements may for example be inserted.

In the second current conductor region 42, the current conductor 4 furthermore preferably comprises positioning pin holes 45, in particular two positioning pin holes 45 per contact arm 4a, 4b. The conductor arrangements can be aligned relative to the current conductor 4 with the aid of positioning pins inserted into the positioning pin holes 45.

The contact arms 4a, 4b are preferably configured in a shouldered fashion, i.e. they preferably respectively comprise a shoulder 49a, 49b which extends along the respective contact arm 4a, 4b. The shoulders 49a, 49b may also be used to align the conductor arrangement relative to the current conductor 4. As an alternative or in addition, the shoulders 49a, 49b make it possible to produce a reliable material bond between the conductor arrangements and the current conductor 4, in particular by the conductor arrangements respectively being welded to the current conductor 4, in particular to the respective contact arm 4a, 4b, at least in the region of the shoulders 49a, 49b. For example, a laser beam may be guided along each of the two shoulders 49a, 49b in order to weld the respective conductor arrangement to the current conductor 4.

Figure 3:
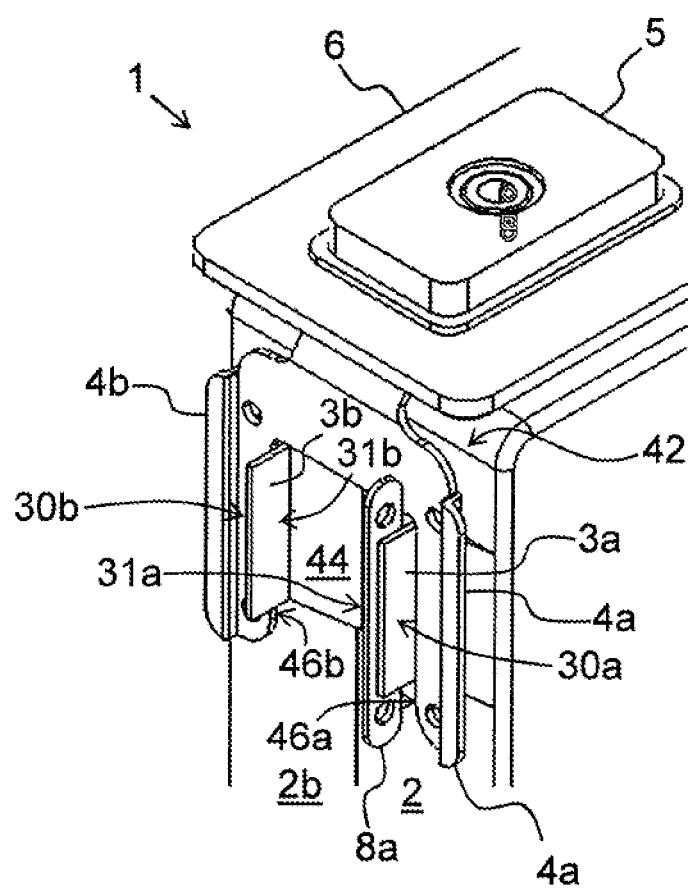
FIG. 3 shows a detail view of an energy storage cell in a first preferred mounting step during the production of the energy storage cell.

FIG. 3 shows a detail view of an energy storage cell 1 in a first preferred mounting step during the production of the energy storage cell 1. In this case, at least one current conductor 4 is connected to a terminal element 5 arranged in a housing cover 6, and is positioned relative to two electrode stacks 2a, 2b in such a way that conductor arrangements 3a, 3b protruding laterally from the electrode stacks 2a, 2b are arranged in a contact arm intermediate space 44 defined between two parallel-extending contact arms 4a, 4b of the current conductor 4.

The conductor arrangements 3a, 3b protruding laterally from the electrode stacks 2a, 2b in this case preferably extend perpendicularly to the current conductor 4 in a second region 42 of the current conductor 4, in which the contact arms 4a, 4b are also arranged. In other words, the conductor arrangements 3*a*, 3*b* in this case cross a plane defined by the two contact arms 4*a*, 4*b*.

The conductor arrangements 3*a*, 3*b* in this case preferably respectively bear with a first side face 30*a*, 30*b* on an edge 46*a*, 46*b* respectively of a contact arm 4*a*, 4*b*.

A connecting element 8*a* is applied, in particular by material bonding, for example by ultrasound welding, on a first of the conductor arrangements 3*a*. The connecting element 8*a* is in this case preferably arranged on a second side face 31*a* lying opposite the first side face 30*a* of the first conductor arrangement 3*a*. In other words, the connecting element 8*a* is arranged on a second side face 31*a* of the first conductor arrangement 3*a*, which faces toward a second side face 31*b* of a second of the conductor arrangements 3*b*.

Figure 4:
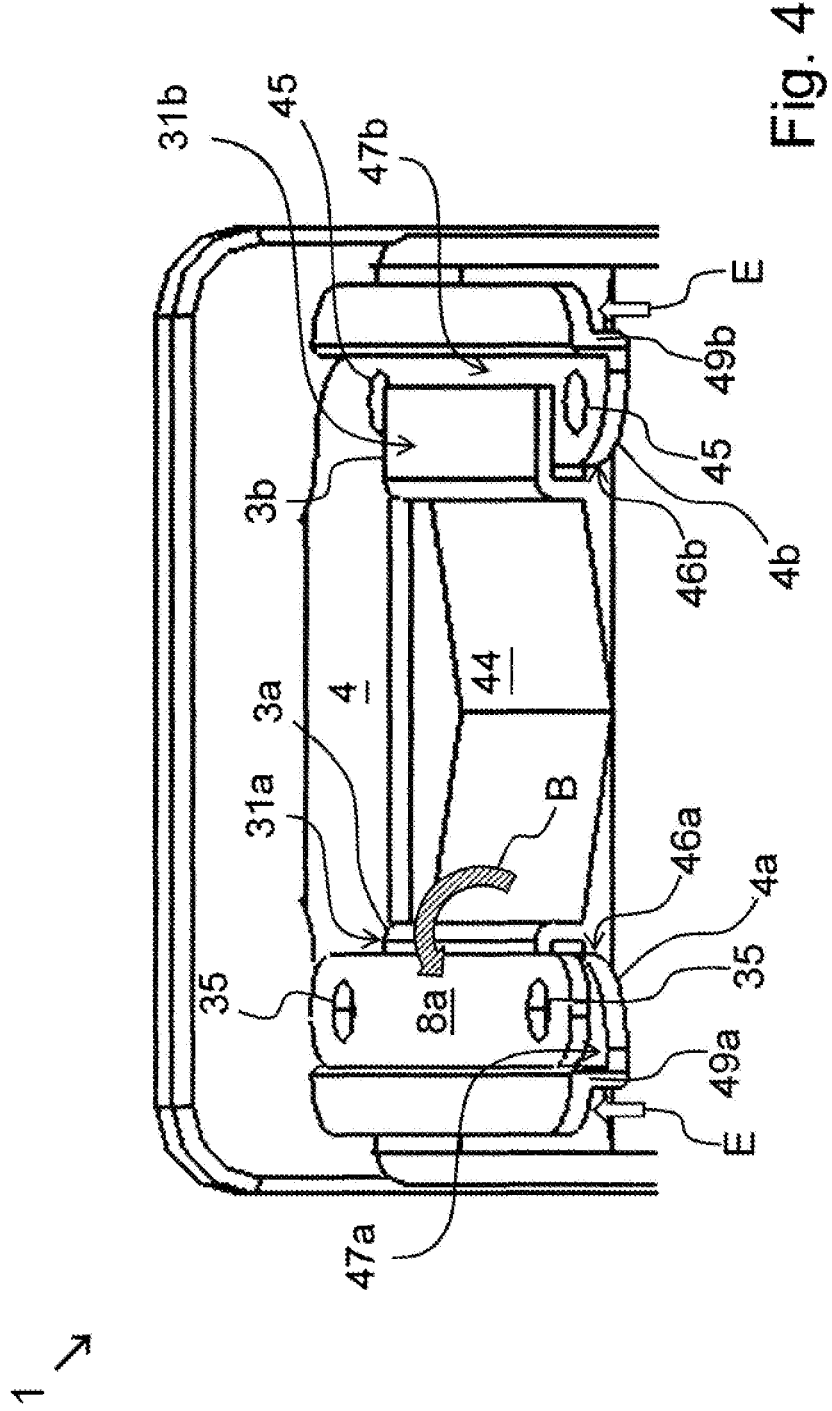
FIG. 4 shows a detail view of an energy storage cell in a second preferred mounting step during the production of the energy storage cell.

FIG. 4 shows a detail view of an energy storage cell 1 in a second preferred mounting step during the production of the energy storage cell 1. In this case, conductor arrangements 3*a*, 3*b* which protrude laterally from electrode stacks and which respectively bear on an edge 46*a*, 46*b* of contact arms 4*a*, 4*b* of a current conductor 4, are bent around the respective edge 46*a*, 46*b*. This is indicated by the arrow B for a first of the conductor arrangements 3*a*.

Because the conductor arrangements 3*a*, 3*b* are positioned in a contact arm intermediate space 44 between the contact arms 4*a*, 4*b*, the conductor arrangements 3*a*, 3*b* are bent in opposite directions around the respective edge 46*a*, 46*b*. In this case, a first side face (see FIG. 3) of the conductor arrangements 3*a*, 3*b* respectively bears at least in sections on a first contact arm side face 47*a*, 47*b*.

A connecting element 8*a* is applied, in particular on a second side face 31*a* lying opposite the first side face, on the first conductor arrangement 3*a*. For better illustration, a connecting element applied on a second of the conductor arrangements 4*b*, in particular on a second side face 31*b*, is not shown.

The connecting element 8*a* is in this case preferably arranged on the second side face 31*a* of the first conductor arrangement 3*a* in such a way that when the first conductor arrangement 3*a* is bent around the edge 46*a*, it bears substantially level on a shoulder 49*a* of the current conductor 4, in particular of the first contact arm 4*a*, extending along the contact arm 4*a*. Correspondingly, the connecting element (not shown) applied on the second conductor arrangement 4*b* preferably also bears level on a shoulder 49*b* of the second contact arm 4*b*.

In order to align the bent conductor arrangements 3*a*, 3*b* relative to the current conductor 4, positioning pins (not shown) may be guided through corresponding positioning pin holes 35 of the connecting element 8*a* and positioning pin holes 45, corresponding therewith, of the contact arms 4*a*, 4*b* (see FIG. 2). In this case, the positioning pin holes 35 in the connecting element 8*a* are preferably arranged concentrically in relation to the positioning pin holes 45 of the contact arms 4*a*, 4*b* because of the bending of the conductor arrangements 3*a*, 3*b* around the respective edge 46*a*, 46*b*, so that a positioning pin can respectively be engaged easily through them. In other words, a positioning pin hole 35 of the contact arms 4*a*, 4*b* is respectively flush with a positioning pin hole 45 of the connecting element 8*a*.

In order to connect the conductor arrangements 3*a*, 3*b* to the current conductor 4, a laser beam may be guided along each contact arm 4*a*, 4*b* so that the conductor arrangements 3*a*, 3*b*, in particular the connecting element 8*a*, is welded to the current conductor 4, in particular to the respective contact arm 4*a*, 4*b*. Preferably, the laser beam is in this case guided along the shoulders 49*a*, 49*b*.

In order to achieve the effect that the current conductor 4, or the contact arms 4*a*, 4*b*, and the bent conductor arrangements 3*a*, 3*b* are in contact during the connection, for example the first side faces (see FIG. 3) bear at least in sections superficially on the first contact arm side faces 47*a*, 47*b*, and a pressing force is preferably exerted on the conductor arrangements 3*a*, 3*b*, in particular on the second side faces 31*a*, 31*b* or on the connecting element 8*a*. This pressing force may be absorbed by supporting elements (not shown) which are arranged below the contact arms 4*a*, 4*b*, i.e. introduced into an intermediate space between the contact arms 4*a*, 4*b* and the electrode stacks, and support the contact arms 4*a*, 4*b* preferably on the second contact arm side faces lying opposite the first contact arm side faces 47*a*, 47*b*.

Preferably, the supporting elements are in this case inserted under the shoulders 49*a*, 49*b* of the contact arms 4*a*, 4*b*, or are positioned there. This is indicated by the arrows E in FIG. 4.

Figure 5:
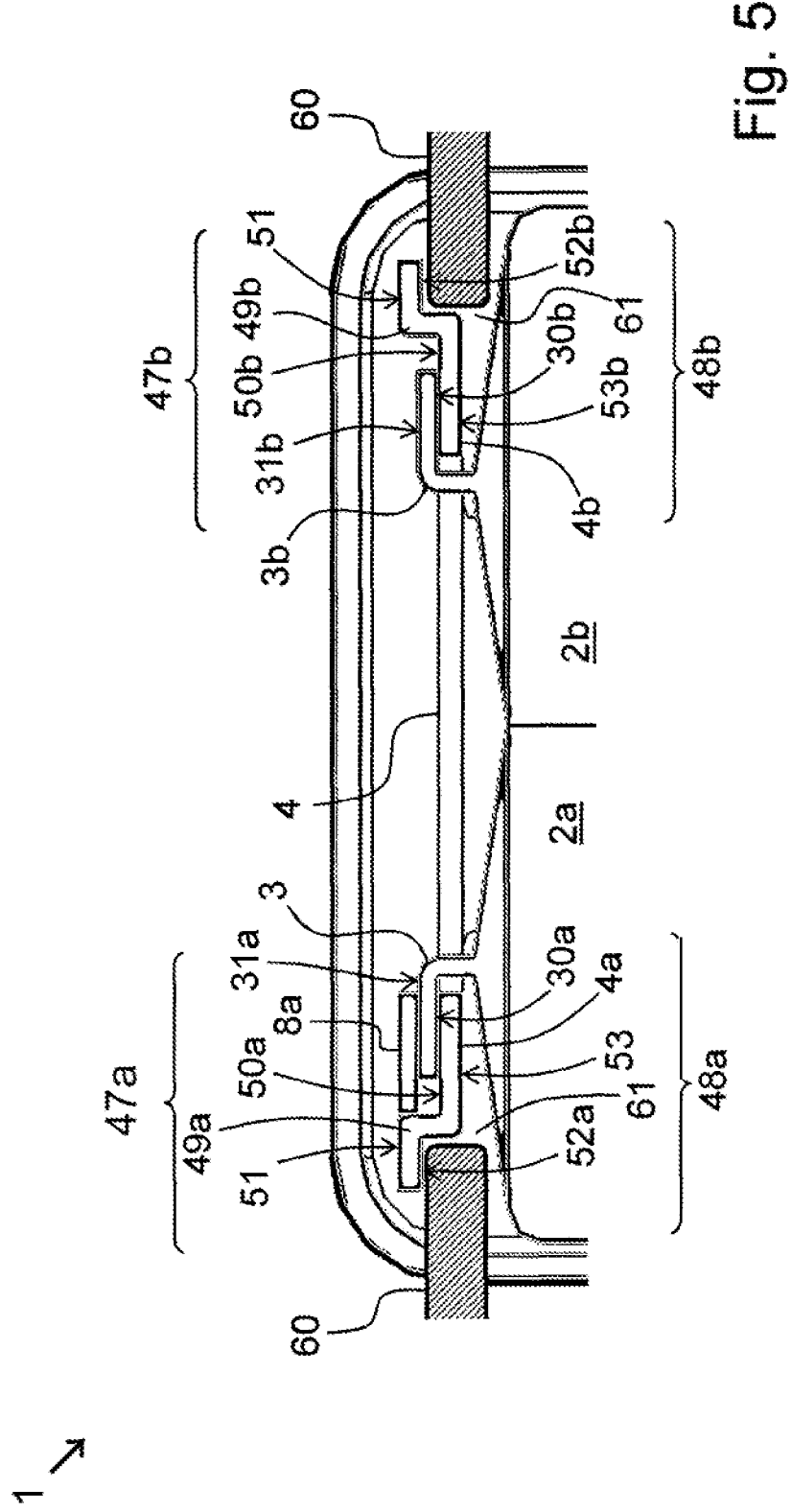
FIG. 5 shows a cross section of the detail view of FIG. 4.

FIG. 5 shows a cross section of the detail view of FIG. 4. In this case, the shoulders 49*a*, 49*b* in the two contact arms 4*a*, 4*b* may be seen clearly.

Preferably, a first section 50*a*, 50*b* and a second section 51*a*, 51*b* of the first contact arm side faces 47*a*, 47*b* are respectively defined by the shoulders 49*a*, 49*b*, the conductor arrangements 3*a*, 3*b* respectively being bent around the edges 46*a*, 46*b* of the two contact arms 4*a*, 4*b* in such a way that the first side faces 30*a*, 30*b* of the conductor arrangements 3*a*, 3*b* respectively bear at least in sections in the first section 50*a*, 50*b* of the first contact arm side faces 47*a*, 47*b*. The one connecting element 8*a* also indicated in FIG. 4, which is preferably applied on the second side face 31*a* of the first conductor arrangement 3*a* in such a way that it ends substantially level with the shoulder 49*a* of the first contact arm 4*a* in the bent state of the first conductor arrangement 4*a*, is in this case preferably flush with the second section 51*a* of the contact arm side face 47*a* of the first contact arm 4*a*. In this way, a laser beam which is guided along the contact arms 4*a*, 4*b* in the region of the respective shoulder 49*a*, 49*b* can weld the current conductor 4 reliably to the conductor arrangements 3*a*, 3*b*, or to the connecting element 8*a*.

Since a pressing force is preferably exerted on the conductor arrangements 3*a*, 3*b* during the welding of the contact arms 4*a*, 4*b* to the bent conductor arrangements 3*a*, 3*b*, supporting elements 60*a*, 60*b* are arranged in an intermediate space 61 defined between the contact arms 4*a*, 4*b* and the cell stacks 2*a*, 2*b*. The contact arms 4*a*, 4*b* in this case preferably bear at least in sections with the second contact arm side faces 48*a*, 48*b* on the supporting elements 60.

The supporting elements 60 may in this case, in particular, be arranged in the intermediate space 61 which is provided by the shoulders 49*a*, 49*b* between the contact arms 4*a*, 4*b* and the electrode stacks 2*a*, 2*b*. Preferably, the contact arms 4*a*, 4*b* in this case bear with second lower-side sections 52*a*, 52*b* of the second contact arm side faces 48*a*, 48*b* on the supporting elements 60, the second lower-side sections 52*a*, 52*b* and first lower-side sections 53*a*, 53*b* of the second contact arm side faces 48*a*, 48*b* being defined by the shoulders 49*a*, 49*b*. The second lower-side sections 52*a*, 52*b* in this case preferably lie opposite the second sections 51*a*, 51*b* of the first contact arm side faces 47*a*, 47*b*.

Figure 6:
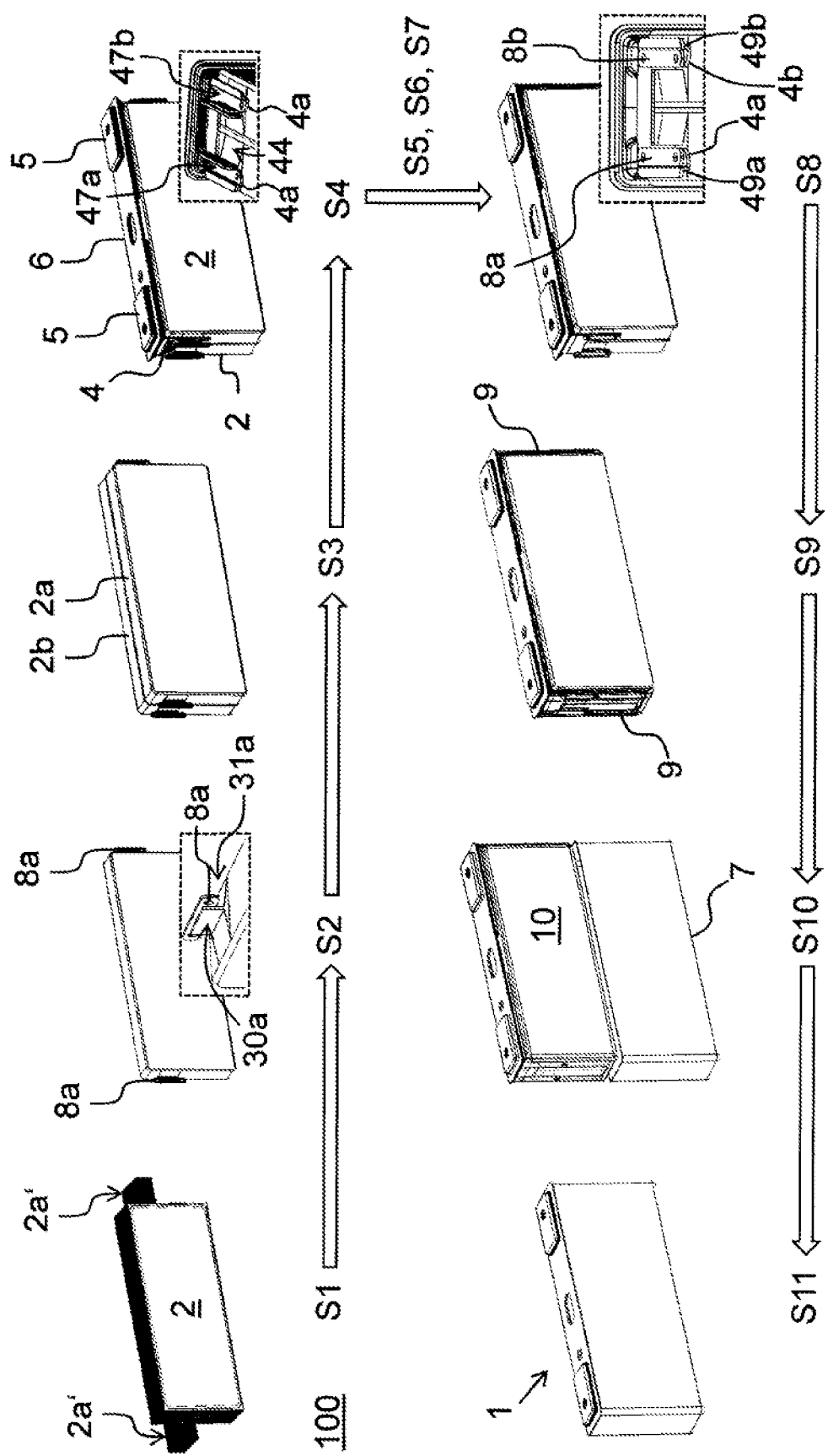
FIG. 6 shows a preferred exemplary embodiment of a method according to the invention.

FIG. 6 shows a preferred embodiment of a method 100 according to the invention for producing electrochemical energy storage cells 1.

In a preparatory step S1, an electrode stack 2*a* is provided, for instance by stacking a plurality of positive electrodes and a plurality of negative electrodes alternately on one another. Each of the electrodes in this case comprises a conductor lug 2a', which protrudes from the electrode stack 2a. The conductor lugs 2a' are in this case arranged, or configured, in such a way that the conductor lugs 2a' of positive electrodes and the conductor lugs 2a' of negative electrodes protrude from the electrode stack 2a on opposite sides of the electrode stack 2a.

Two conductor arrangements, in particular respectively a conductor arrangement corresponding to the positive electrodes and a conductor arrangement corresponding to the negative electrodes, are produced from the conductor lugs 2a', for instance by the conductor lugs 2a' made of foil being pressed together. In an application step S2, a connecting element 8a may then respectively be applied, for instance by ultrasound welding, on a second side face 31a of the conductor arrangement formed in this way. The second side face 31a in this case lies opposite a first side face 30a of the conductor arrangement, as is represented in the detail view, denoted by the dashed line, corresponding to the application step S2.

The preparatory step S1 and the application step S2 are preferably carried out at least a second time in order to produce a further electrode stack 2b having two conductor arrangements and connecting elements applied thereon. As an alternative thereto, in the preparatory step S1 the electrode stack 2a provided may be divided and the second electrode stack 2b may thereby be produced.

During the application step S2, the connecting elements 8a are preferably applied on the conductor arrangements of the second electrode stack 2b in such a way that the connecting elements 8a applied on the conductor arrangements of the first electrode stack 2a face toward the connecting elements applied on the conductor arrangements of the second electrode stack 2b. In the combining step S3, the first and second electrode stacks 2a, 2b prepared in this way are combined with the connecting elements facing toward one another.

Preferably, a current conductor 4, which is electrically connected to a respective terminal element 5 arranged on a housing cover 6, is respectively provided in a positioning step S4 for the two conductor arrangements corresponding to the positive electrodes and for the two conductor arrangements corresponding to the negative electrodes. In particular, the current conductors 4 are in this case positioned relative to the conductor arrangements so that two conductor arrangements are respectively arranged in an intermediate space 44 which is defined between two contact arms 4a, 4b of the respective current conductor 4.

For example, the housing cover 6 with the current conductors 4 may be placed on the two electrode stacks 2b, 2a so that the conductor arrangements are respectively inserted between the contact arms 4a, 4b of the current conductors 4. In this case, the conductor arrangements preferably bear respectively with the first side face on an edge of one of the contact arms 4a, 4b, as is represented in the detail view, denoted by the dashed line, corresponding to the positioning step S4.

In a bending step S5, the conductor arrangements are bent around the respective edge of the contact arms 4a, 4b so that the first side faces of the conductor arrangements bear at least in sections on the respective first contact arm side faces 47a, 47b. The conductor arrangements and contact arms 4a, 4b prepared in this way are supported in a supporting step S6 on second contact arm side faces lying opposite the first contact arm side faces 47a, 47b, for instance by supporting elements being introduced into an intermediate space which is defined between the contact arms 4a, 4b and the electrode stacks 2a, 2b, in particular the side faces of the electrode stacks 2a, 2b. In this way, in a pressing step S7, a pressing force may be applied onto the conductor arrangements bearing at least in sections on the first contact arm side faces 47a, 47b, so that the conductor arrangements are preferably pressed superficially onto the first contact arm side faces 47a, 47b.

In this case, it is conceivable in particular for the supporting step S6 to be carried out before the bending step S5, in order to absorb already forces occurring during the bending of the conductor arrangements around the respective edge with the supporting elements. In this way, for example, unintended deformation of the contact arms 4a, 4b may be avoided.

In a connecting step S8, the conductor arrangements, in particular the connecting elements, are connected to the current conductors 4, in particular to the contact arms 4a, 4b, for instance by laser welding. In this case, a laser beam is preferably guided along each contact arm 4a, 4b, for example along shoulders 49a, 49b, which are formed in the contact arms 4a, 4b and with which the connecting elements preferably end level and/or flush, as is represented in the detail view, denoted by the dashed line, corresponding to the connecting step S8.

In a securing step S9, the two electrode stacks 2a, 2b, preferably with the current conductors 4, are secured by side frames 9, for example fixed by clamp-like enclosures at least in sections. The electrode stacks 2a, 2b fixed in this way may then be electrically insulated in an insulation step S10 with an insulation element 10, in particular from a housing 7 into which the electrode stacks 2a, 2b are introduced. In a sealing step S11, the housing 7 and the housing cover 6 are connected, in particular welded, to one another, preferably by laser welding.

While at least one exemplary embodiment has been described above, it should be noted that there are many variants thereof. It is in this case also to be noted that the exemplary embodiments described represent nonlimiting examples, and the scope, the applicability or the configuration of the apparatuses and methods described herein are not thereby intended to be restricted. Rather, the description above will provide the person skilled in the art with instruction to implement at least one exemplary embodiment, it being understood that various modifications may be carried out in the functionality and the arrangement of the elements described in an exemplary embodiment, without thereby departing from the subject matter respectively defined in the appended claims, and the legal equivalents thereof.

LIST OF REFERENCES 1 electrochemical energy storage cell
2a, 2b electrode stack
3a, 3b conductor arrangement
4 current conductor
4a, 4b contact arm
5 terminal element
6 housing cover
7 housing
8a, 8b connecting element
9 side frame
10 insulation element
11 filling opening
11a filling opening plug
30a, 30b first side face
31a, 31b second side face 35 positioning pin hole of the connecting element
40 curvature region
41 first current conductor region
42 second current conductor region
43 connector receiver
44 contact arm intermediate space
45 positioning pin hole of the current conductor
46a, 46b edge
47a, 47b first contact arm side face
48a, 48b second contact arm side face
49a, 49b shoulder
50a, 50b first section
51a, 51b second section
52a, 52b first lower-side section
53a, 53b second lower-side section
60 supporting element
61 intermediate space
100 method
S1-S11 method steps

What is claimed is:

1. A method for producing electrochemical energy storage cells, the method comprising:
 a positioning step in which a current conductor, which is adapted for electrical connection of an electrode stack to a cell terminal and comprises a contact arm, is positioned relative to the electrode stack such that an edge of the contact arm bears on a first side face of a conductor arrangement of the electrode stack, wherein the conductor arrangement protrudes from the electrode stack;
 a bending step in which the conductor arrangement is bent around the edge of the contact arm such that the first side face of the conductor arrangement bears at least in sections on a first contact arm side face;
 a supporting step in which the contact arm is supported on a second contact arm side face lying opposite the first contact arm side face;
 a pressing step in which a pressing force is exerted on the conductor arrangement bearing at least in sections on the first contact arm side face;
 a connecting step in which the conductor arrangement is connected to the current conductor; and
 an application step in which a connecting element is applied on a second side face of the conductor arrangement, lying opposite the first side face, such that the connecting element ends substantially level with a shoulder of the contact arm, wherein the shoulder extends along the contact arm, when the conductor arrangement is bent around the edge of the contact arm.

2. The method according to claim 1, wherein the current conductor is positioned relative to the electrode stack in the positioning step such that an intermediate space is defined between the second contact arm side face and the electrode stack, and a supporting element for supporting the contact arm against the pressing force is introduced into the intermediate space in the supporting step.

3. The method according to claim 2, wherein the supporting element is removed from the intermediate space after the connection of the conductor arrangement to the current conductor.

4. The method according to claim 1, wherein a laser beam for welding the conductor arrangement to the current conductor is guided at least in sections along the contact arm in the connecting step.

5. The method according to claim 1, wherein the connecting element is applied on the second side face by ultrasound welding.

6. The method according to claim 1, further comprising:
 an aligning step in which a positioning pin is engaged through at least one positioning pin hole in the connecting element and at least one positioning pin hole in the contact arm.

7. The method according to claim 1, wherein the conductor arrangement of the electrode stack is inserted in the positioning step together with a further conductor arrangement of a further electrode stack jointly into a contact arm intermediate space defined between the contact arm of the current conductor and a further contact arm of the current conductor, wherein the further contact arm of the current conductor extends parallel to the contact arm of the current conductor, so that the second side face of the conductor arrangement lies opposite a second side face of the further conductor arrangement.

8. The method according to claim 7, wherein at least the bending step, the supporting step, the pressing step and the connecting step are carried out for each of the two conductor arrangements.

* * * * *